United States Patent [19]

Kiselev et al.

[11] 3,935,299

[45] Jan. 27, 1976

[54] PROCESS FOR PREPARATION OF WIDE-PORE ADSORBENT FOR USE IN CHROMATOGRAPHY

[76] Inventors: Andrei Vladimirovich Kiselev, Leninskie Gory, Mgu Zona M kv. 160, Moscow; Galina Lvovna Kustova, ulitsa Burevestnika 9, kv. 9; Boris Alexandrovich Lipkind, ulitsa Burevestnika, 9, kv. 3, both of Gorky; Jury Stepanovich Nikitin, Leningradskoe shosse, 120, korpus 3, kv. 4, Moscow, all of U.S.S.R.

[22] Filed: Jan. 31, 1975

[21] Appl. No.: 546,184

Related U.S. Application Data

[63] Continuation of Ser. No. 252,462, May 11, 1972, Pat. No. 3,888,972.

[52] U.S. Cl. ............... 423/338; 423/335; 423/339; 252/449; 252/451
[51] Int. Cl.² .................. C01B 33/12; C01B 33/16; C01B 33/18
[58] Field of Search ................... 423/335, 338, 339; 252/449, 451

[56] References Cited
UNITED STATES PATENTS

| | | | |
|---|---|---|---|
| 2,519,622 | 8/1950 | Archibald et al. | 252/449 X |
| 2,698,305 | 12/1954 | Plank et al. | 252/449 X |
| 2,699,376 | 1/1955 | Hay | 252/451 X |
| 2,982,719 | 5/1961 | Gilbert et al. | 252/449 X |
| 3,403,109 | 9/1968 | Colgan et al. | 252/451 |
| 3,652,215 | 3/1972 | Aboutboul et al. | 423/338 |
| 3,652,216 | 3/1972 | Krekeler et al. | 423/338 |

OTHER PUBLICATIONS

Book "The Colloid Chemistry of Silica and Silicates," by Ralph K. Iler, 1955 Ed., pp. 137, 138. Cornell Univ. Press, Ithaca, N.Y.

*Primary Examiner*—Edward Stern
*Attorney, Agent, or Firm*—Haseltine, Lake & Waters

[57] ABSTRACT

A process for preparing a wide-pore adsorbent adapted for use in chromatography, comprising mixing fine disperse non-porous silica having a specific surface area S of 35 to 380 m²/g with water followed by drying the aqueous suspension at a temperature within the range of 100° to 450°C to give a silica xerogel and particulating thereof. The xerogel, prior to the particulation or thereafter, is subjected to the hydrothermal treatment in an autoclave at a temperature within the range of from 100° to 380°C and under a pressure of 1 to 300 atm., followed by drying at a temperature of 100° to 300°C.

The above-described process enables the preparation of an adsorbent with larger pores as compared to adsorbents prepared from fine disperse non-porous silica and produced by conventional processes. The process according to the present invention makes it possible to produce an adsorbent having a specific surface area within the range of from 2 to 280 m²/g and an average pore diameter of from 230 to 30,000 A, while retaining a high pore volume of 0.9 to 1.9 cm³/g. Such adsorbent is useful in chromatography for the purposes of separation, purification and analysis of a wide range of substances: from low- and moderately-boiling compounds up to polymers, and more particularly, biopolymers, and viruses.

3 Claims, No Drawings

PROCESS FOR PREPARATION OF WIDE-PORE ADSORBENT FOR USE IN CHROMATOGRAPHY

This application is a continuation application of Ser. No. 252,462, filed May 11, 1972, now U.S. Pat. No. 3,888,972, issued June 10, 1975.

The present invention relates to processes for the production of a wide-pore adsorbent adapted for use is chromatography from a fine disperse non-porous silica having a specific surface area of 35 to 380 m$^2$/g. Such an adsorbent in useful as an active packing in chromatographic columns and a support of stationary phases in gas and liquid chromatography, as well as a molecular sieve in gel-permeation chromatography.

Known in the art is a process for preparing a wide-pore adsorbent comprising mixing a fine disperse non-porous silica having a specific surface area S of 170 or 280 m$^2$/g with water, followed by drying the suspension at a temperature of 100° to 450°C to produce a silica xerogel. Said xerogel is then subjected to grinding and screening (cf. N. K. Bebris, A. V. Kiselev, Y. S. Nikitin "Kolloidnyj zhournal" 29, No. 3, 326, 1967; N. K. Bebris et al. "Neftechimia" journal, 8, No. 3, 481, 1968).

The absorbent produced by the known process has a specific surface area of 160 or 260 m$^2$/g at an average pore diameter of 550 and 230 A respectively.

Said prior-art process has a disadvantage residing in impossibility of increasing pore size of the resulting adsorbent within broad limits, thereby restricting its applicability in chromatography. Thus, for the analysis of high-molecular substances by methods of gel-permeation chromatography a range of adsorbent with various pore sizes is required including those with pores larger than in the adsorbent produced by the known process.

Another disadvantage of said process resides in great losses of the adsorbent during grinding thereof to particles less than 0.05 mm in size (up to 15 percent by weight of the starting silica).

Still another disadvantage of the said process resides in an irregular shape of the particles resulting from grinding, whereby the uniformity of distribution of the chromatographic column packing particles and hydrodynamic properties of the packing are impaired.

It is an object of the present invention to eliminate the aforesaid disadvantages.

More particularly, it is an object of the present invention to change the manner of treatment of a xerogel produced by drying an aqueous suspension of a fine disperse non-porous silica having a specific surface area S of 35 to 380 m$^2$/g at a temperature of 100° to 450°C in order to prepare and adsorbent possessing necessary structural characteristics and reduce its losses during the preparation thereof.

According to the present invention, said object has been accomplished by that the xerogel of silica prior to the particulation or thereafter is subjected to hydrothermal treatment in an autoclave at a temperature of 100° to 380°C and under a pressure of 1 to 300 atm., followed by drying thereof at a temperature of 100° to 300°C.

The process of the present invention enables the preparation of an adsorbent with larger pores and smaller specific surface are as compared to the adsorbent produced by the known process. By the hydrothermal treatment of the xerogel produced from non-porous silica it is possible to prepare an adsorbent having a specific surface area of from 2 to 280 m$^2$/g and average pore diameter of from 230 to 30,000 A while retaining a high pore volume of from 0.9 to 1.9 cm$^3$/g. Such an adsorbent is useful in chromatography for separation, purification, and analysis of a wide range of substances: from low- and moderately-boiling substances up to polymers, more particularly bipolymers, and viruses.

As it has been mentioned hereinabove, the hydrothermal treatment of the silica xerogel may be effected both prior to and after the particulation of the xerogel. In doing so, the particulation of the xerogel is performed by grinding thereof.

In addition, in case of hydrothermal treatment of the xerogel followed by the drying thereof after the particulation procedure, it is advisable to effect and procedure simultaneously with drying the silica suspension by spraying thereof in a drying oven at a temperature of 400°–450°C. As a result of such combination of stages (suspension drying and xerogel particulation) the resulting xerogel is in the form of spherical particles which are much less liable to destruction in the autoclave during the hydrothermal treatment, this being especially important under high pressure and temperature treatment conditions. In addition, drying the suspension and particulation of xerogel under the above-specified conditions enables the obviation of xerogel grinding and is conducive to a reduction of adsorbent losses to as low as 5 to 7 percent by weight of the starting silica. The production of the adsorbent in the form of spherical particles also provides conditions for improving the uniformity of distribution of the chromatographic column packing particles and hydrodynamic properties of the packing.

For making the adsorber applicable within a wide temperature range, for removing bound water therefrom and for increasing the adsorbent strength, it is advisable, prior to the hydrothermal treatment and/or after the hydrothermal treatment and drying of the silica xerogel, to calcinate said xerogel at a temperature of 550° to 1,000°C in air or in water vapour atmosphere.

The process for the preparation of a wide-pore adsorbent from fine-disperse non-porous silica and adapted for use in chromatography, according to the present invention, is effected in the following manner.

1 part by weight of fine disperse silica (such as aerosil, white soot) is mixed with 1.6–12 parts by weight of water till a suspension is formed which is dried at a temperature of 100° to 450°C. The resulting silica xerogel is placed into an autoclave, added with water and subjected to the hydrothermal treatment at a temperature of 100° to 380°C under a pressure of 1 to 300 atm. during a period of 4 to 100 hours. After the hydrothermal treatment the xerogel is dried at a temperature of 100 to 300°C. The resulting adsorbent is then ground and screened into fractions. Grinding may also be performed prior to the hydrothermal treatment of the xerogel (after drying the aqueous suspension of silica).

To produce a wide-pore adsorbent in the form of spherical particles and reduce the adsorbent losses it is advisable to perform drying of the aqueous suspension of silica and the particulation of xerogel simultaneously by spraying said suspension in a drying oven at a temperature of 400° to 450°C. The resulting xerogel particles have a spherical from and their size ranges from 0.05 to 1 mm. Then the hydrothermal treatment of the xerogel and its drying are effected is accordance with the above-described procedure, whereafter the adsorbent is ready for use.

As it has been mentioned hereinbefore, for making the adsorbent applicable within a wider temperature range, for removing bound water therefrom and increasing the adsorbent strength, it is advisable, prior to the hydrothermal treatment and/or after the hydrothermal treatment and drying of the xerogel of silica, to calcinate said xerogel at a temperature of 550° to 1,000°C in air or in water vapour atmosphere during a period of 6 to 24 hours.

For a better understanding of the present invention the following examples of the preparation of a wide-pore adsorbent from a fine disperse non-porous silica are given by way of illustration.

EXAMPLE 1

280 g of fine disperse non-porous silica having a specific surface area S of 175 m$^2$/g are mixed with one liter of water to yield a homogeneous suspension which is then dried at a temperature of 140°C. The resulting xerogel is divided into three samples, each of them is subjected to the hydrothermal treatment in an autoclave under the following conditions: sample I, at 100°C and 1 atm. pressure during 69 hours; sample II, at 275°C and 60 atm. during 4 hours; sample III, at 380°C and 300 atm. during 4 hours. Then the samples are dried in a drying cabinet at 200°C, ground and screened to separate the 0.05–0.8 mm fraction.

The yield of the final product for each of the samples is about 85 percent by weight of the starting silica.

The structural characteristics of the adsorbents produced from the three xerogel samples are given in Table 1 below.

Table 1

| Structural characteristics of the resulting adsorbent | Adsorbent from Sample I | Adsorbent from Sample II | Adsorbent from Sample III |
|---|---|---|---|
| Specific surface area, S m$^2$/g | 135 | 48 | 4 |
| Average pore diameter, d, A | 560 | 1,600 | 19,500 |
| Pore volume, V, cm$^3$/g | 1.9 | 1.9 | 1.9 |

EXAMPLE 2

Into an impeller 60 kg of fine disperse non-porous silica having a specific surface area of 380 m$^2$/g are added along with 490 l of water and thoroughly intermixed. The resulting suspension is dried in a spraying furnace at a temperature of 450°C with a simultaneous particulation of the xerogel. 62 kg of the particulated xerogel featuring spherical particles of 0.05 to 0.8 mm in size and humidity of 5 percent is subjected to the hydrothermal treatment in an autoclave at a temperature of 220°C under 20 atm. pressure during 24 hours. Then the xerogel is dried at 300°C during 8 hours, whereafter it is screened to obtain the 0.05 to 0.8 mm fraction.

The yield of the desired product is 57.9 kg or 96.5 percent by weight of the starting silica. The adsorbent has the following structural characteristics: specific surface area S = 66 m$^2$/g; average pore diameter d = 940 A; pore volume V = 1.55 cm$^3$/g.

EXAMPLE 3

280 g of fine disperse non-porous silica having a specific surface area S of 160 m$^2$/g are mixed with one liter of water to yield a homogenous suspension which is dried at the temperature of 200°C. The resulting xerogel is ground and screened to separate the 0.05- to 0.5 mm fraction and calcinated in air at 750°C for 10 hours. The calcinated xerogel is subjected to the hydrothermal treatment in an autoclave at the temperature of 250°C under a pressure of 40 atm. for a period of 4 hours. Then the xerogel is dried at 200°C and screened to separate the 0.05 to 0.5 mm fraction.

The yield of the final adsorbent is 92 percent by weight of the starting silica. The adsorbent has the following characteristics: specific surface area S = 33 m$^2$/g; average pore diameter d = 1,650 A; pore volume V = 1.37 cm$^3$/g.

EXAMPLE 4

280 g of high disperse non-porous silica having a specific surface area S of 175 m$^2$/g are mixed with one liter of water to produce a homogeneous suspension which is dried at a temperature of 140°C. The resulting xerogel is hydrothermally treated in an autoclave at a temperature of 275°C and under a pressure of 60 atm. during four hours. Thereafter the xerogel is dried at 200°C and divided into two samples. Sample 1 is calcinated in air at 1,000°C for six hours, while sample 2 is calcinated in an atmosphere of water vapour at 750°C for six hours. The calcinated samples are ground and screened to separate the 0.05 to 0.8 mm fraction.

The yield of the final product for each of the samples is 84 percent by weight of the starting silica.

The structural characteristics of the adsorbent prepared from the two xerogel samples are given in Table 2 below.

Table 2

| Structural characteristics of the resulting adsorbent | Adsorbent from Sample 1 | Adsorbent from Sample 2 |
|---|---|---|
| Specific surface area S, m$^2$/g | 45 | 47 |
| Average pore diameter, d, A | 1,600 | 1,620 |
| Pore volume V, cm$^3$/g | 1.8 | 1.9 |

Said calcination of samples results in essential reduction of the bound water content W ($\mu$mol H$_2$O/g of adsorbent) and hydroxyl groups concentration on the adsorbent surface $\alpha_{OH}$ (memol OH/m$^2$ of adsorbent surface). Thus, the adsorbent before the calcination has: W = 630 and $\alpha_{OH}$ = 8.0; Sample 1 has: W = 30 and $\alpha_{OH}$ = 1.3; Sample 2 has: W = 190 and $\alpha_{OH}$ = 5.7. The calcination enhanced the adsorbent strength. The losses at vibration abrasion of the adsorbent prior to the calcination are 4.5 percent by weight, while those of the calcinated samples 1 and 2 are 2.5 and 1.8 percent by weight respectively.

EXAMPLE 5

Into an impeller 60 kg of fine disperse non-porous silica having a specific surface area S of 380 m²/g and 490 l of water are charged and thoroughly intermixed. The resulting suspension is dried in a spraying furnace at a temperature of 450°C with a simultaneous of the xerogel. 62 kg of the particulated xerogel featuring spherical particles 0.05-0.8 mm in size and 5 percent humidity are subjected to the hydrothermal treatment in an autoclave at a temperature of 220°C and under a pressure of 20 atm, for a period of 24 hours. Then the xerogel is dried at 120°C and calcinated at 900°C in air for a period of six hours. After the calcination the adsorbent is screened to separate the 0.05-0.8 mm fraction.

The yield of the final product is 57.6 kg or 96 percent by weight of the initial non-porous silica. The structural characteristics of the adsorbent are as follows. Specific surface area $S = 64$ m²/g; average pore diameter $d = 950$ A; pore volume $V = 1.52$ cm³/g.

EXAMPLE 6

Into an impeller 60 kg of fine disperse non-porous silica having a specific surface area S of 175 m²/g and 430 l of water are charged and thoroughly intermixed. The resulting suspension is dried in a spraying furnace at a temperature of 400°C with a simultaneous particulation of xerogel. The particulated xerogel featuring spherical particles of 0.1 to 1 mm in size is divided into three samples; each of them is hydrothermally treated under the following conditions. Sample 1, 220°C and 20 atm. for 96 hours; Sample 2, 280°C and 100 atm. for 16 hours; Sample 3, 370°C and 290 atm. for 6 hours. The samples are then dried at a temperature of 100°C and calcinated in air at 900°C over a period of 24 hours. After the calcination the samples are screened to separate the 0.1 to 1 mm fraction.

The yield of the final product produced from Sample 1 is 96 percent; Sample 2, 94.8 percent; Sample 3, 93 percent by weight of the starting silica.

The structural characteristics of the adsorbents produced from the three samples of the xerogel are given in Table below.

Table 3

| Structural characteristics of the resulting adsorbent | Adsorbent from Sample 1 | Adsorbent from Sample 2 | Adsorbent from Sample 3 |
| --- | --- | --- | --- |
| Specific surface area S,m²/g | 46 | 16 | 2.2 |
| Average pore diameter d, A | 1,600 | 4,400 | 30,000 |
| Pore volume V, cm³/g | 1.81 | 1.77 | 1.74 |

EXAMPLE 7

45 g of fine disperse non-porous silica having a specific surface area S of 35 m²/g are mixed with 100 ml of water. The resulting aqueous suspension is dried at a temperature of 100°C in drying cabinet. The xerogel thus obtained is hydrothermally treated at 100°C and under a pressure of 3 atm. for a period of 4 hours. Then the xerogel is dried at 300°C and calcinated in air at 750°C for eight hours. After the calcination the adsorbent is ground and screened to separate the 0.05 to 0.5 mm fraction.

The yield of the final product is 84 percent by weight of the starting silica. The adsorbent has the following structural characteristics: specific surface area $S = 29$ m²/g; average pore diameter $d = 1,250$ A; pore volume $V = 0.92$ cm³/g.

EXAMPLE 8

Into an impeller 60 kg of fine disperse non-ferrous silica having a specific surface area S of 175 m²/g are charged along with 430 l of water and thoroughly intermixed. The resulting suspension is dried in a spraying furnace at a temperature of 400°C with a simultaneous particulation of xerogel. The particulated xerogel featuring spherical particles of 0.1-1 mm in size and 5 percent humidity is calcinated in air at a temperature of 550°C for a period of eight hours. The calcinated xerogel is then hydrothermally treated in an autoclave at a temperature of 220°C and under 20 atm. pressure for a period of 96 hours. Thereafter, the xerogel is dried at 120°C and calcinated in the air at 900°C for 24 hours. After the calcination the adsorbent is screened to separate the 0.1 to 1 mm fraction.

The yield of the final product is 98 percent by weight of the starting silica. The adsorbent has the following structural characteristics: specific surface area $S = 44$ m²/g average pore diameter $d = 1,500$ A; pore volume $V = 1.68$ cm³/g.

EXAMPLE 9

Into an apparatus impeller 60 kg of fine disperse silica having a specific surface area S of 175 m²/g are charged along with 450 l of water and thoroughly intermixed. The resulting suspension is dried in a spraying furnace at a temperature of 450°C with a simultaneous particulation of xerogel. 62 kg of the particulated xerogel featuring spherical particles of 0.1 to 1 mm in size and 5 percent humidity are calcined in an atmosphere of water vapour at 850°C for a period of six hours.

The calcinated xerogel is hydrothermally treated at a temperature of 115°C and under a pressure of 1.5 atm. for a period of four hours. Then the xerogel is dried at 300°C and screened to separate the 0.1-1 mm fraction.

The yield of the final product is 97.5 percent by weight of the starting silica. The adsorbent has the following structural characteristics: specific surface area $S = 85$ m²/g, average pore diameter $d = 700$ A; pore volume $V = 1.52$ cm³/g.

We claim:

1. A process of preparing a porous silica adsorbent having a pore diameter of 560 to 19,500 A adapted for use in chromatography comprising the steps of (1) mixing finely dispersed non-porous silica having a specific surface area of 35 to 380 m²/g with water to form an aqueous suspension; (2) drying the suspension at a temperature of 100° to 450°C. to form a silica xerogel; (3) hydrothermally treating said dried xerogel at a temperature of 100° to 380°C and under a pressure of 1 to 300 atm; (4) drying the treated xerogel at a temperature of 100° to 300°C.; and particulating the dried xerogel by grinding either after step (2) or after step (4).

2. A process according to claim 1 wherein the porous silica adsorbent has a pore volume of 0.92 to 1.9 cm³/g and the non-porous silica has a specific surface area of 35 to 175 m²/g.

3. A process according to claim 1 further comprising the step of calcining the silica xerogel in an atmosphere of steam or air at a temperature of from 750° to 1,000°C. either (a) prior to the hydrothermal treatment or (b) after the hydrothermal treatment and drying or both (a) and (b).

* * * * *